3,048,778
HIGH FREQUENCY POWER METER
Carl H. Rumpel, Bedminster, N.J., assignor to Bell Telephone Laboratories, Incorporated, New York, N.Y., a corporation of New York
Filed July 21, 1959, Ser. No. 828,668
7 Claims. (Cl. 324—95)

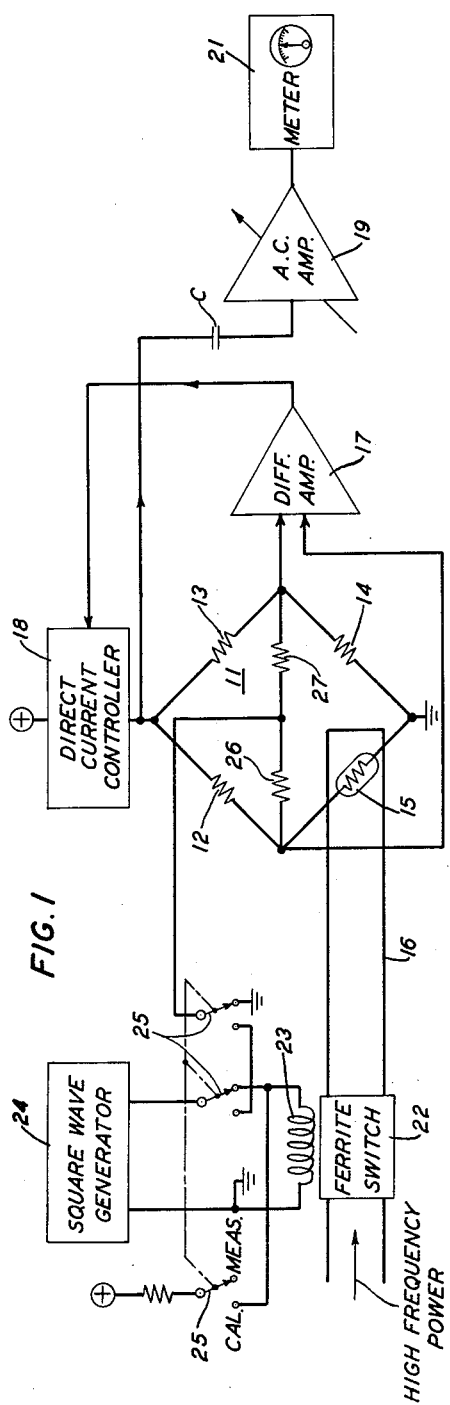

This invention relates to power measuring apparatus and more particularly to apparatus for measuring high frequency power.

Heretofore, power measurements have been made in high frequency circuits by utilizing a power measuring bridge containing a temperature variable resistor in one of its arms. The high frequency power to be measured is dissipated in this resistor whereby its temperature and resistance are changed, thus unbalancing the bridge. Various indicating devices have been employed to interpret the unbalance in terms of the power to be measured. In some of the more recent bridge circuits, the bridge is returned to balance by changing the power dissipation in the thermally sensitive resistor by auxiliary means. This auxiliary means is calibrated and hence the change in power required to rebalance the bridge is known and is taken as the amount of high frequency power.

A common form of thermally sensitive resistor which has found extensive use in this art is known as the thermistor. This is a contraction of the words "thermal resistor" and designates a type of circuit element whose electrical resistance varies rapidly with temperature. Detailed information concerning these nonlinear resistance devices may be obtained by reference to the Bell Laboratories Record for December 1940, page 106.

Since thermistors and the like are, of necessity, designed to be extremely sensitive to temperature variations, it becomes very clear that relatively large errors may be introduced by not taking into account ambient temperature variations. Various schemes have been devised for compensating power measuring circuits against said ambient temperature variations. These, invariably, make use of a second thermally sensitive resistor which is placed as close as practicable to the power measuring resistor. The Patent 2,799,826, to E. E. Eberle, discloses a typical prior art, temperature compensating arrangement which includes a second thermally sensitive resistor connected in a second bridge circuit. The second bridge circuit is, in turn, interconnected with the main bridge circuit for the purpose of compensating the latter against ambient temperature changes.

In addition to the added circuit complexity of such prior art arrangements, they leave something to be desired in terms of performance. The thermally sensitive resistors must, necessarily, be spaced some distance apart and, therefore, they are not subject to exactly the same ambient temperature changes (note, the compensating resistor must not be exposed to the radio frequency power to be measured). This gives rise to circuit instability and necessitates constant recalibration. Further, the pair of thermally sensitive resistors should possess exactly identical temperature coefficient characteristics and any deviation therefrom must either by suffered, in terms of reduced accuracy, or, in turn, be compensated for.

It is an object of the present invention to eliminate the effect of ambient temperature changes in high frequency power measurements.

It is a further object of this invention to provide a direct-reading, high frequency, power meter which simply and expeditiously eliminates the effect of ambient temperature changes on power measurements.

In accordance with the present invention, a self-balancing type of bridge arrangement is employed which includes a conventional resistance bridge having a thermistor in one of the arms thereof, a differential amplifier for measuring bridge unbalance and a direct-current controller. Bridge unbalance due to temperature-impedance changes in the thermistor produces an error signal across the bridge output which is amplified and then applied to the controller for increasing or decreasing the direct current delivered to the bridge so as to maintain bridge balance. The direct-current input to the bridge varies automatically with changes in the high frequency power applied to the thermistor as well as with ambient temperature changes. The bridge network, differential amplifier and controller thus constitute a servo loop, the output of which is "A.-C." or capacitively coupled to a meter calibrated to read in power directly. A ferrite "on-off" switch modulates the input high frequency power at a rate slow enough for said servo loop to follow. The servo loop following the changes in the power applied to the thermistor generates an A.-C. output signal which passes through the A.-C. coupling and is measured by the meter. This coupling, however, eliminates the slowly varying component of said output signal resulting from ambient temperature changes.

The advantages and features of the invention will become more apparent from the following detailed description which, together with the accompanying drawing, discloses a preferred embodiment. In the drawing:

FIG. 1 is a schematic diagram of a direct-reading power meter in accordance with the present invention; and FIG. 2 is a circuit diagram of the bridge network, differential amplifier and direct-current controller shown in FIG. 1.

Referring now to FIG. 1 of the drawing, there is shown a conventional Wheatstone bridge network 11 comprising resistances 12, 13, and 14 and a thermally sensitive resistance 15. The resistance 15 can comprise a thermistor or, alternatively, any of the other known types of thermally sensitive resistance elements. Further, the fact that most present day thermistors and the like have negative coefficients is immaterial to the invention as materials of either sign are equally adaptable.

As schematically indicated in FIG. 1, the thermistor 15 is mounted, in conventional fashion, within a waveguide 16 for the purpose of measuring the high frequency power therein. The power in said waveguide will heat the thermistor, thereby changing its resistance and thus unbalancing the bridge.

A differential amplifier 17 has its input terminals connected to the output terminals of the bridge network. The output of amplifier 17 is connected to the input of controller 18, with the latter, in turn, being connected between a direct-current source and the input to the bridge. As will be clear to those in the art, the bridge network 11, differential amplifier 17 and controller 18 act as a servo system to maintain the thermistor at the required operating temperature and impedance. Bridge unbalance due to temperature-impedance changes in the thermistor produces an error signal across the bridge output. This error signal is then amplified in differential amplifier 17 and applied to the controller 18 which increases or decreases the current input to the bridge in the direction required to maintain bridge balance.

If high frequency energy is applied to the thermistor the temperature of the same begins to change but the servo system quickly corrects for the new condition. This correction is such that the servo loop reduces its power input to the thermistor by precisely the same amount supplied by the high frequency power. The magnitude of the reduction is then a measure of said high frequency power. An ambient temperature increase produces the same effect. Thus, the input current to the bridge varies automatically with changes in the high frequency power applied to the thermistor as well as with ambient temperature changes.

The output of the thermistor servo loop is A.-C. coupled, by means of capacitor C and amplifier 19, to the meter 21 which is calibrated to read in power directly. This A.-C. coupling will not pass the slowly varying component of the servo output signal resulting from ambient temperature changes. Accordingly, when no high frequency energy is applied to the thermistor, the meter 21 will not indicate even though the ambient temperature may be changing quite radically.

If continuous high frequency power is applied to the thermistor, the effect is exactly the same as an ambient temperature change, discounting of course the initial transient. However, in accordance with the invention, the high frequency power is modulated prior to its being applied to said thermistor. The modulation rate can be quite rapid compared with ambient temperature changes but still slow enough for the thermistor and servo loop to follow. The servo loop following the changes in the modulated power applied to the thermistor generates an A.-C. output signal which passes through the aforementioned A.-C. coupling and is measured directly by the meter 21.

The high frequency power is modulated, in accordance with the invention, by means of a ferrite "on-off" switch 22. The switch solenoid 23 is driven by a square wave signal (e.g., ten cycles per second) derived from generator 24. The requirements of the switch are simple, namely, in one condition the switch should be in the "on" or transmitting state so as to pass the high frequency power on the thermistor and in the other condition, the switch should be in the "off" or nontransmitting state. A typical ferrite switch that may be used to perform the desired switching function is disclosed in an article by J. A. Weiss, entitled "A Faraday Rotation Switch for the TH System," Bell Laboratories Record, April 1959.

The arrangement shown in FIG. 1 facilitates the initial calibration of the power meter. With the multi-pole, single-throw switch 25 thrown to the left-hand or calibrate position, a square wave of the same periodicity as the modulating wave and of known peak amplitude is applied to the bridge, via balanced resistors 26 and 27, and hence to the thermistor 15. That portion of the servo output signal which corresponds thereto is thence coupled to the meter 21 in the above-described fashion. The gain of amplifier 19 is adjusted to "zero-set" the meter which thereafter remains in calibration indefinitely. As shown in FIG. 1, the solenoid 23 is connected to a direct-current source during calibration so as to block the high frequency power from the thermistor.

The meter 21 may comprise a voltmeter and since the form of the signal applied thereto is known, the same may be calibrated to indicate power directly.

In FIG. 2 there is shown a detailed circuit diagram of the bridge network 11, differential amplifier 17 and direct-current controller 18. This circuit comprises five n-p-n type transistors 31 through 35 which, with the biases applied as shown, are all normally conducting. The transistors 31 through 34, and their related circuitry, comprise the differential amplifier, while the transistor 35 provides the desired direct-current control action. The differential amplifier circuit is symmetrical in that the circuit parameters associated with transistors 31, 33 are, respectively, the same as those associated with transistors 32, 34.

If high frequency power is applied to thermistor 15, its temperature tends to increase causing a reduction in its resistance. This results in an initial lowering of the potential at the base of transistor 31 (the drop in base potential is of the order of several hundredths of a volt). The emitter potential tends to follow that of the base so as to maintain a constant potential difference therebetween. With the emitters of transistors 31 and 32 interconnected as shown, the decrease in the emitter potential of transistor 31 results in a proportionate decrease in the potential at the emitter of transistor 32. The base potential of transistor 32 remains substantially constant and hence an increased forward bias appears between the emitter and base of the latter transistor. This increased forward bias causes increased collector current flow and a resultant potential drop at the collector.

The combined action of transistors 33 and 34 is similar to that of transistors 31 and 32 described above. With a more or less constant potential difference between the base and emitter of transistor 31, the collector current flow, and hence collector voltage, remains substantially constant. Since the base of transistor 33 is therefore also held at a substantially constant potential, the emitter potential of transistor 33 remains constant, thus holding the potential of the emitter of transistor 34 constant. With a substantially constant emitter potential and a decreased potential at the base, the collector current of transistor 34 decreases. An increased positive potential thus appears at the collector of transistor 34 and the directly connected base of transistor 35.

Resistors 37 and 38 are connected between a direct-current source and the bridge input. The transistor 35 has its emitter-collector path connected in parallel across the resistor 38 and the bridge network for the purpose of controlling the magnitude of the direct current applied to the bridge. In the assumed condition, the increased positive potential at the base of transistor 35 serves to increase the current flow in said emitter-collector path, thereby reducing the current delivered to the bridge. The reduction in the direct current applied to the bridge will be of a magnitude such as to tend to return the bridge to a balanced condition.

The variations in the current delivered to the bridge network produce a corresponding, varying, voltage drop thereacross which is applied, via capacitance C, to the amplifier 19 and direct-reading meter 21.

The foregoing disclosure relates to only a preferred embodiment of the invention and, therefore, it is to be understood that numerous modifications or alterations may be made without departing from the spirit and scope of the invention.

What is claimed is:

1. A high frequency power measuring device comprising a bridge network having four arms, one of which arms includes a thermally sensitive resistor, means for applying the high frequency power to be measured to said sensitive resistor to tend to change its temperature and consequently its resistance, means connected to said bridge for automatically supplying variable power thereto to maintain it in substantial balance irrespective of the conditions tending to change the temperature and resistance of said sensitive resistor, means for on-off modulating the high frequency power at a predetermined rate prior to its application to said sensitive resistor, and means coupled to said power supplying means for indicating only those variations in said supplied power which occur at said predetermined rate.

2. A high frequency power measuring device comprising a bridge network having four arms, one of which arms includes a thermally sensitive resistor, means connected to said bridge for automatically supplying variable power thereto to maintain it in substantial balance irrespective of the conditions tending to change the temperature and resistance of said sensitive resistor, means applying pulsed high frequency power to said sensitive resistor, a meter calibrated to read in power directly, and filter means coupled between the output of said variable power supplying means and said meter, said filter means serving to pass to said meter those variations in said supplied power which occur at the pulse rate of said high frequency power and to block the slower variations thereof arising from ambient temperature changes.

3. A high frequency power measuring device comprising a bridge network having four arms, one of which arms includes a thermally sensitive resistor, means for applying the high frequency power to be measured to said sensitive resistor to tend to change its temperature and consequently its resistance, means connected to said bridge for automatically supplying variable power thereto to maintain it in substantial balance irrespective of the conditions tending to change the temperature and resistance of said sensitive resistor, means for on-off modulating the high frequency power at a predetermined rate prior to its application to said sensitive resistor, a meter calibrated to read in power directly, and filter means coupled between the output of said power supplying means and said meter, said filter means serving to pass to said meter those variations in said supplied power which occur at said predetermined rate and to block the slower variations thereof arising from ambient temperature changes.

4. A power measuring device as defined in claim 3 wherein the high frequency power modulating means comprises a ferrite switch which alternately passes and blocks said high frequency power.

5. A high frequency power measuring device comprising a bridge network having four arms, one of which arms includes a thermally sensitive resistor, means adapted to apply the high frequency power to be measured to said sensitive resistor to tend to change its temperature and consequently its resistance, means connected to said bridge for automatically supplying a variable direct current thereto to maintain it in substantial balance irrespective of the conditions tending to change the temperature and resistance of said sensitive resistor, means for switching said high frequency power on and off at a predetermined rate prior to its application to said sensitive resistor, a meter calibrated to read in power directly, and capacitive means connected between the output of said direct current supplying means and said meter, said capacitive means serving to pass to said meter those variations in said supplied current which occur at said predetermined rate and to block the slower variations thereof arising from ambient temperature changes.

6. A high frequency power measuring device comprising a bridge network having four arms, one of which includes a thermally sensitive resistor, means adapted to apply the high frequency power to be measured to said sensitive resistor to tend to change its temperature and consequently its resistance, a differential amplifier connected to the output of said bridge network for generating an error signal in response to bridge unbalance, control means for supplying a variable direct current to said bridge network, said control means being operative in response to said error signal to vary the direct current supplied to the bridge so as to maintain it in substantial balance, means for switching said high frequency power on and off at a predetermined rate prior to its application to said sensitive resistor, a meter calibrated to read in power directly, and means coupled between the output of said control means and said meter, said means serving to pass to said meter those variations in said supplied current which occur at said predetermined rate and to block the slower variations thereof arising from ambient temperature changes.

7. A power measuring device as defined in claim 6 wherein the last recited means comprises a capacitance.

References Cited in the file of this patent
UNITED STATES PATENTS

| | | |
|---|---|---|
| 2,437,449 | Ames | Mar. 9, 1948 |
| 2,901,700 | Bolie | Aug. 25, 1959 |
| 2,921,262 | Jaffe | Jan. 12, 1960 |